US009211908B2

(12) United States Patent
Stjernling

(10) Patent No.: US 9,211,908 B2
(45) Date of Patent: Dec. 15, 2015

(54) STEERING SPINDLE ARRANGEMENT

(71) Applicant: SCANIA CV AB, Södertälje (SE)

(72) Inventor: Martin Stjernling, Farsta (SE)

(73) Assignee: SCANIA CV AB (SE)

( * ) Notice: Subject to any disclaimer, the term of this patent is extended or adjusted under 35 U.S.C. 154(b) by 0 days.

(21) Appl. No.: 14/406,798

(22) PCT Filed: Jun. 18, 2013

(86) PCT No.: PCT/SE2013/050713
§ 371 (c)(1),
(2) Date: Dec. 10, 2014

(87) PCT Pub. No.: WO2013/191630
PCT Pub. Date: Dec. 27, 2013

(65) Prior Publication Data
US 2015/0175201 A1    Jun. 25, 2015

(30) Foreign Application Priority Data

Jun. 21, 2012    (SE) ...................................... 1250669

(51) Int. Cl.
B62D 7/18       (2006.01)
F16C 21/00      (2006.01)
F16C 25/00      (2006.01)

(52) U.S. Cl.
CPC . B62D 7/18 (2013.01); F16C 21/00 (2013.01); F16C 25/00 (2013.01)

(58) Field of Classification Search
CPC ........... B62D 7/18; F16C 25/00; F16C 25/02; F16C 25/06; F16C 21/00
See application file for complete search history.

(56) References Cited

U.S. PATENT DOCUMENTS

| 1,474,057 | A | * | 11/1923 | Pridemore | ................ 280/93.512 |
| 1,865,202 | A | * | 6/1932 | Milligan | ................... 280/93.512 |
| 2,428,651 | A | * | 10/1947 | Buese | ....................... 280/93.512 |
| 3,477,771 | A |   | 11/1969 | Herbenar | |
| 3,479,051 | A |   | 11/1969 | Weiss | |
| 4,043,567 | A | * | 8/1977 | Kaiser | ...................... 280/93.512 |

(Continued)

FOREIGN PATENT DOCUMENTS

| EP | 1 477 388 B1 | 11/2004 |
| FR | 2 576 860 A1 | 8/1986 |
| WO | WO 97/13674 | 4/1997 |

OTHER PUBLICATIONS

International Search Report dated Oct. 18, 2013 issued in corresponding International patent application No. PCT/SE2013/050713.

(Continued)

Primary Examiner — Ruth Ilan
Assistant Examiner — Laura Freedman
(74) Attorney, Agent, or Firm — Ostrolenk Faber LLP

(57) ABSTRACT

A steering spindle arrangement includes a spindle bolt (2), an axle beam (1) that is secured to a central part (2b) of the spindle bolt (2), a stub axle (5) that has a first arm (6) that is rotatable around a first part (2a) of the spindle bolt (2) via a first bearing (11) and a second arm (8) that is rotatably arranged around a second part (2c) of the spindle bolt (2) via a second bearing (22). An adjusting mechanism (4, 18) makes it possible to adjust a variable rotation resistance for the stub axle (5) when it is rotated around the spindle bolt (2).

8 Claims, 1 Drawing Sheet

(56) References Cited

U.S. PATENT DOCUMENTS

| | | | |
|---|---|---|---|
| 4,286,799 A * | 9/1981 | Ayres | 280/93.512 |
| 4,635,952 A * | 1/1987 | Smith | 280/93.512 |
| 5,709,399 A * | 1/1998 | Smith, Jr. | 280/93.512 |
| 5,722,784 A * | 3/1998 | Link | 403/158 |
| 5,975,547 A * | 11/1999 | Stroh et al. | 280/93.512 |
| 6,029,986 A * | 2/2000 | Bodin et al. | 280/93.512 |
| 7,093,843 B2 * | 8/2006 | Varela et al. | 280/93.512 |
| 8,764,034 B2 * | 7/2014 | Wells et al. | 280/93.511 |
| 2003/0222422 A1 | 12/2003 | Barila | |
| 2004/0262875 A1 | 12/2004 | Hamperl | |

OTHER PUBLICATIONS

International Preliminary Report on Patentability dated Oct. 22, 2014 issued in corresponding International patent application No. PCT/SE2013/050713.

* cited by examiner

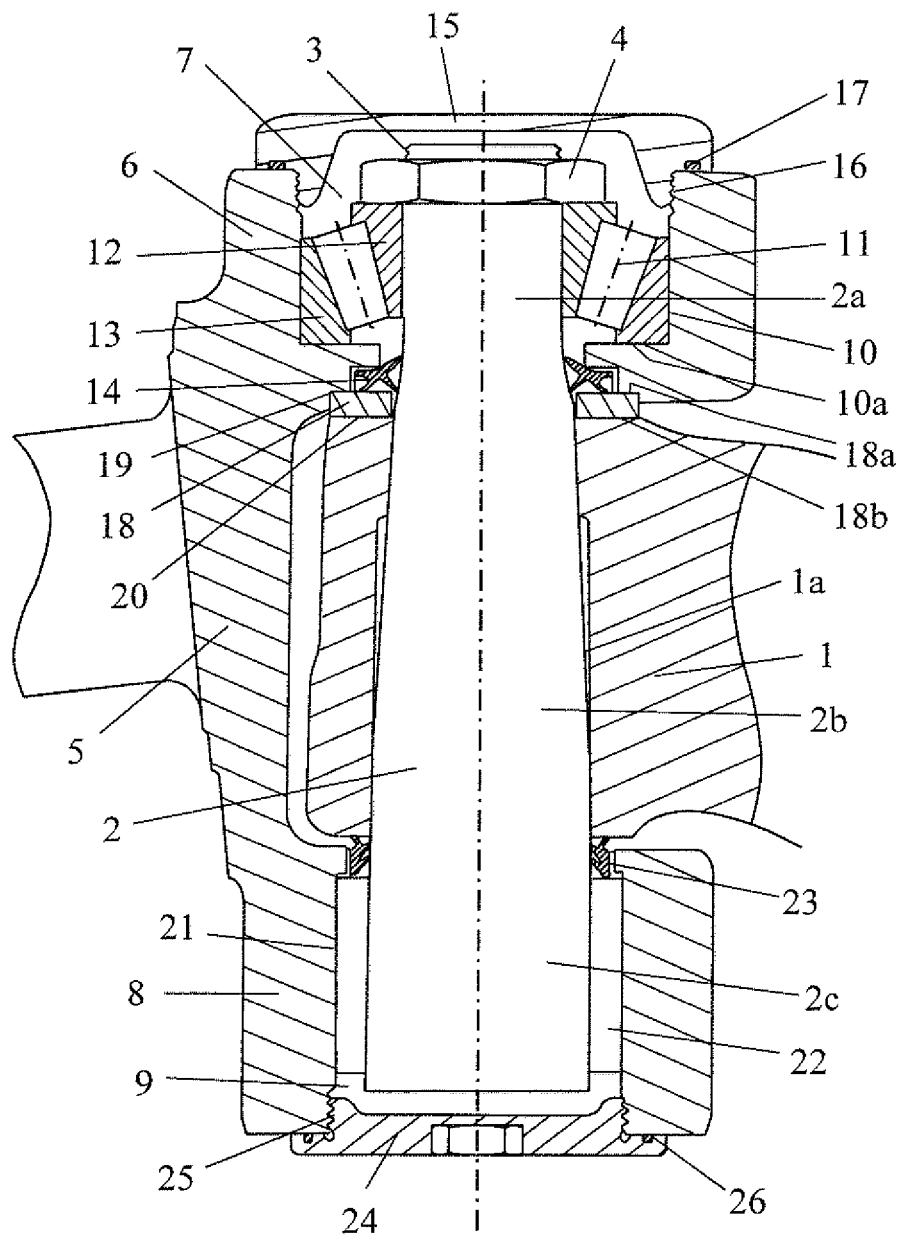

STEERING SPINDLE ARRANGEMENT

CROSS-REFERENCE TO RELATED APPLICATIONS

The present application is a 35 U.S.C. §§371 National Phase conversion of PCT/SE2013/050713, filed Jun. 18, 2013, which claims priority of Swedish Patent Application No. 1250669-7, filed Jun. 21, 2012, the contents of which are incorporated by reference herein. The PCT International Application was published in the English language.

TECHNICAL BACKGROUND OF THE INVENTION AND PRIOR ART

The present invention concerns a steering spindle arrangement for a vehicle.

As a rule, a steering spindle arrangement for a steerable wheel in a vehicle comprises a steeling spindle bolt with a conically shaped part for securing an axle beam. A stub axle that supports the wheel is pivotably arranged on the steering spindle bolt by means of an upper bearing, which can be a conical roller bearing, and a lower bearing, which can be a sliding bearing. In this case the upper bearing absorbs both axial and radial forces, while the lower bearing absorbs radial forces. However, most roller bearings need to be pre-tensioned in order to eliminate play in the roller bearing. One known means of pre-tensioning the bearing is to use shims. The inner ring and outer ring of the roller bearing can be loaded by means of appropriately placed shims with a force so that the bearing play is eliminated. However, the installation of shims is complicated and does not always produce the desired effect.

WO 97/13674 describes a spindle bolt that is threaded at both an upper end and a lower end. An upper nut is secured on the upper thread and a lower nut is secured on the lower thread. An inner ring on an upper conical roller bearing can be locked against a surface of the axle beam by means of the upper nut. The upper conical roller bearing and a lower conical roller bearing can be pre-tensioned by means of the lower nut. In this case no shims are used to pre-tension the roller bearings. Because the lower nut is used to pre-tension both the lower roller bearing and the upper roller bearing, forces are transferred from the nut to both a lower arm and an upper arm by a bearing journal. This force loading of the arms of the bearing journal results in elastic deformation of the bearing journal. Pre-tensioning a roller bearing by means of an elastically deformed component is not desirable. Roller bearings should be secured and pre-tensioned between two essentially rigid surfaces.

It is suitable for a vehicle wheel that is arranged on a pivotable stub axle to rotate around a spindle bolt with a suitable rotational resistance. If the rotational resistance is too low, there is a risk that vibrations will arise in the motion-transferring transmission that transfers steering motions from the vehicle steering wheel to the steerable wheels. If the rotational resistance is too great, an unnecessarily heavy force is needed to turn the wheels.

SUMMARY OF THE INVENTION

The object of the present invention is to provide a steering spindle arrangement wherein it is possible to provide an adjustable rotational resistance for a stub axle that is rotating around a spindle bolt.

This object is achieved by means of a steering spindle arrangement as described herein. An adjusting mechanism makes it possible to set a desired rotational resistance for the stub axle as it is pivoted around the spindle bolt. A steerable vehicle wheel that is arranged on the stub axle can thus be rotated with a desired rotational resistance around the spindle bolt. As a result, vibrations in the vehicle steering wheel can be avoided while, at the same time, overly excessive force is not required to turn the wheel and steer a vehicle.

According to one embodiment of the present invention, the adjusting mechanism comprises a sliding bearing that is arranged in a position between the stub axle and the axle beam, and a tensioning device which makes it possible to create a variable force that presses the stub axle and the axle beam toward the sliding bearing so that the stub axle achieves a desired resistance as it is pivoted around the spindle bolt. The rotational resistance here is related to the compressive force with which the stub axle and the axle beam are pressed against the sliding bearing. Even if the stub axle and the axle beam are pressed against the sliding bearing with a relatively heavy compressive force, the sliding bearing ensures that the stub axle can essentially always achieve a pivoting motion in relation to the spindle bolt.

According to one embodiment of the invention, the sliding bearing is annular and is arranged around the spindle bolt in an area between a first part of the spindle bolt and an intermediate part of the spindle bolt. Within this area the sliding bearing can achieve contact with both the stub axle and the axle beam. The sliding bearing advantageously has a first sliding surface on a first side that is in contact with a contact surface of the first arm of the stub axle and a second sliding surface on a second side that is in contact with a contact surface of the axle beam. The sliding bearing advantageously has a flat first sliding surface that is in contact with a flat contact surface of the stub axle and a flat second sliding surface that is in contact with a flat contact surface of the axle beam. Said flat contact surfaces preferably have an extension in a perpendicular plane in relation to a longitudinal axis through the spindle bolt.

According to one embodiment of the present invention the sliding bearing is made of a rigid metal material. The sliding element thus sustains essentially no elastic deformation when it is subjected to said compressive force. The sliding element is advantageously made of a steel material that is strong and resistant to corrosion.

According to one embodiment of the present invention, the tensioning device comprises a nut that is rotatably arranged on the spindle bolt for example on a threaded part of a first end of the spindle bolt. The nut has one surface that is in direct or indirect contact with one surface of the stub axle. The axle beam is advantageously secured on a conically shaped intermediate part of the spindle bolt. Upon tightening the nut, the nut that is in contact with the stub axle and the spindle bolt that is in contact with the axle barn will be displaced in an axial direction toward one another so that the contact surface of the stub axle and the contact surface of the axle beam are pressed against the sliding surfaces of the sliding ring. By adjusting the torque of the nut, the contact surface of the stub axle and the contact surface of the axle beam can be pressed against the opposing sliding surfaces of the sliding ring with a variable pressure that results in the imparting of a rotational resistance to the stub axle when it is rotated around the spindle bolt, which resistance is related to the torque of the nut.

According to one embodiment of the present invention, the first bearing is a roller bearing and the tensioning device is arranged so as to create said compressive force against the sliding bearing, via the roller bearing, so that the roller bearing receives a pre-tension at the same time as the tensioning device generates said compressive force that acts upon the sliding bearing. Roller bearings and, in particular, conical roller bearings must generally be pre-tensioned. In this case the compressive force that is generated by the tensioning device to impart said rotational resistance can also be utilized to pre-tension the bearing. The roller bearing is advantageously a conical roller bearing that can absorb both radial and axial forces.

According to one embodiment of the present invention, the roller bearing has an inner ring that is arranged so as to come into contact with said nut, and an outer ring that is arranged in a bearing seat in an arm of the stub axle. In this case a torquing of the nut transferred transfers a force from the nut, via the roller bearing, to the stub axle so that the contact surface of the stub axle is pressed against the first sliding surface of the sliding bearing. At the same time as the nut is torqued, the intermediate conical part of the spindle bolt supplies a motion that results in the contact surface of the axle beam being pressed against the second sliding surface on the opposite side of the sliding bearing. In this case both the nut and the roller bearing are arranged on the first part of the spindle bolt at the same time as the sliding bearing is arranged in the area between the first part of the spindle bolt and the central or intermediate part of the spindle bolt. The force from the nut here loads only a part of the first arm of the stub axle. The stub axle thus sustains essentially no elastic deformation, as can be the case when both arms of the stub axle are loaded. In this case the roller bearing undergoes an essentially rigid pre-tensioning.

According to one embodiment of the present invention, the spindle arrangement comprises a seal that is arranged around the spindle bolt in contact with the spindle bolt, the sliding bearing and the first arm of the stub axle. Dirt is thereby prevented from penetrating into the roller bearing in connection to the sliding bearing.

According to one embodiment of the present invention, the second bearing is a sliding bearing or a needle bearing. Radial forces can thus be absorbed by the second part of the spindle bolt. Other types of bearings can also be used. Further, the bearings are advantageously protected against the penetration of dirt through the use of suitable seals.

BRIEF DESCRIPTION OF THE DRAWING

A preferred embodiment of the invention is described below with reference to the accompanying drawing, in which:

FIG. 1 shows a steering spindle arrangement according to the present invention.

DETAILED DESCRIPTION OF A PREFERRED EMBODIMENT OF THE INVENTION

FIG. 1 shows a section through one end of an axle beam 1 in a vehicle. The axle beam 1 is equipped with a conically shaped hole 1a for securing a spindle bolt 2. The spindle bolt 2 has a corresponding conically shaped central part 2b that contains the hole 1a by means of which the spindle bolt 2 is secured in the axle beam. The spindle bolt 2 has an upper part 2a with a cylindrical shape and a lower part 2c with a cylindrical shape. The upper part 2a has a smaller diameter than the lower part 2c. The upper part 2a of the spindle bolt 2 is equipped with a threaded part 3. A castle nut 4 is secured on the threaded part 3. A steerable and non-driving wheel of the vehicle is adapted so as to be secured on a stub axle 5 that is rotatably arranged around the spindle bolt 2. The stub axle 5 has an upper arm 6 with a first through-going hole 7 for receiving the upper part 2a of the spindle bolt and a lower arm 8 with a second through-going hole 9 for receiving the lower part 2c of the spindle bolt.

The first through-going hole 7 of the upper arm 6 is equipped with a bearing seat 10 for receiving a conical roller bearing 11. The conical roller bearing 11 has an inner ring 12 that is secured around the upper part 2a of the spindle bolt and an outer ring 13 that is arranged in the bearing seat 10. The bearing seat 10 has a stop surface 10a that defines a mounting position for the outer ring 13. A first elastic seal 14 is arranged in a lower opening of the first through-going hole 7 in a position below the conical roller bearing 11. The first elastic seal 14 prevents dirt from penetrating into the conical roller bearing 11 via the lower opening of the first through-going hole 7. A first bearing cover 15 seals an upper opening of the first through-going hole 7. The bearing cover 15 is screwed fast by means of threads 16 that are arranged on the upper opening of the first through-going hole 7. A first O-ring 17 ensures that the first bearing cover 15 creates a tight seal of the upper opening of the first through-going hole 7, so that dirt cannot penetrate into the conical roller bearing 11 by that path.

A sliding bearing in the form of a sliding ring 18 made of a rigid metal material, such as a steel material, is arranged around the spindle bolt 2 in a position below the first elastic seal 14. The sliding ring 18 is arranged in a boundary area between the central part 2b of the spindle bolt and the upper part 2a of the spindle bolt. The sliding ring 18 is designed as a washer, and comprises a first flat upper gliding surface 18a that is in contact with a flat contact surface 19 of the stub axle 5 and a second flat lower sliding surface 18b that is in contact with a flat contact surface 20 of the axle beam 1. The lower arm 8 of the stub axle 5 comprises a second through-going hole 9. The second through-going hole 9 is equipped with a bearing seat 21 for receiving a sliding bearing 22. A second elastic seal 23 is arranged in a position above the sliding bearing 22 in connection to an upper opening to the second through-going hole 9. A second bearing cover 24 seals a lower opening of the second through-going hole 9. The bearing cover 24 is screwed fast by means of threads 25. A second O-ring 26 ensures that the second bearing cover 24 creates a tight seal at the lower opening of the second through-going hole 8. The second bearing cover 24 and the second elastic seal 23 create a tight seal that prevents dirt from penetrating into the sliding bearing 22.

The castle nut 4 is torqued before the first bearing cover 15 is screwed on during a process of installing the steering spindle arrangement. The castle nut 4 is screwed onto the threaded part 3 of the upper part 2a of the spindle bolt until it comes into contact with an upper surface of the inner ring 12 of the roller bearing. The castle nut 4 is then tightened to a predetermined torque by means of a suitable tool. Once the castle nut 4 has been torqued, a lower surface of the castle nut 4 loads the inner ring 12 of the conical roller bearing with a compressive force. This compressive force, which acts to press the inner ring 12 downward, is transmitted to the outer ring 13 via the conical rollers of the roller bearing 11. The force is subsequently transferred from the outer ring 13 to the stop surface 10a of the valve seat, which constitutes a part of the upper arm 6 of the stub axle 5. This downwardly directed force finally acts upon the stub axle 5 so that the contact surface 19 of the stub axle is pressed against the upper sliding surface 18a of the sliding bearing 18.

When the castle nut 4 is torqued, the spindle bolt 2 undergoes a brief displacement motion in an axial direction upward in relation to the castle nut 4. The conical central part 2b of the spindle bolt transfers this motion to the axle beam 1, which is upwardly displaced a corresponding distance, so that the contact surface 20 of the axle beam is pressed against the lower sliding surface 18b of the sliding bearing 18 with a force that is related to the torque of the castle nut 4. Once the castle nut 4 has been torqued, the contact surface 19 of the stub axle and the contact surface 20 of the axle beam are pressed against the opposite sliding surfaces 18a, 18b of the sliding bearing 18 with a compressive force that is related to the torque of the castle nut. The stub axle 5 is thus rotatably arranged around the spindle bolt 2 with a rotational resistance that is defined by the compressive force with which the contact surface 19 of the stub axle and the contact surface 20 of the axle beam are pressed against the sliding ring 18, which is in turn dependent upon the torque of the castle nut 4. By tightening the castle nut to an appropriate torque, the stub axle can acquire a desired rotational resistance when it is rotated around the spindle bolt 2. The rotational resistance can be adjusted by means of the castle nut 4 as needed, in a very simple manner.

The force that is transferred from the castle nut 4 to the sliding ring 18 is thus guided via the roller bearing 11 to the sliding ring 18. The inner ring 12 and outer ring 13 of the roller bearing 11 thus undergo a pre-tensioning in relation to one another when the castle nut 4 is torqued. Said force is guided in this case in an essentially vertical direction downward from the castle nut 4 to the sliding ring 18. The conical roller bearing 11 undergoes a pre-tensioning that is defined by the castle nut 4 and the stop surface 10a of the bearing seat. The castle nut 4 and the stop surface 10a of the bearing seat are essentially rigid surfaces that produce a rigid pre-tensioning of the conical roller bearing 11. Given the appropriate design of the components involved, a desired rotational resistance can be imparted to the stub axle 5 when it is rotated around the spindle bolt 2 at the same time as an appropriate pre-tensioning is imparted to the conical roller bearing 1. An adjusting mechanism is obtained by means of, among other components, the castle nut 4 and the sliding ring 18, by means of which mechanism the rotational resistance of the stub axle around the spindle bolt 2 can be varied steplessly and with good precision. The steering spindle arrangement according to the foregoing also enables relatively simple installation in a vehicle.

The invention is in no way limited to the embodiment described in the drawing, but rather can be varied freely within the limits of the claims. The steering spindle arrangement can, of course, be installed so that the upper end and the lower end exchange places. The second sliding bearing 22 can be replaced by a needle bearing or another type of bearing.

The invention claimed is:

1. A steering spindle arrangement comprising:
 a spindle bolt having a central part;
 a first part and a second part between which the central part is disposed;
 an axle beam secured to the central part of the spindle bolt;
 a stub axle having:
 a first arm that is rotatable around the first part of the spindle bolt via a first bearing;
 the stub axle having a second arm that is rotatable around the second part of the spindle bolt via a second bearing;
 an adjusting mechanism configured to adjust a variable rotational resistance for the stub axle when the stub axle is rotated around the spindle bolt; and
 the adjusting mechanism comprises a sliding bearing between the stub axle and the axle beam, a tensioning device configured and operable to generate an adjustable force that presses the stub axle and the axle beam from opposite sides of the sliding bearing for causing the stub axle to acquire a selected resistance when the stub axle is rotated around the spindle bolt,
 wherein the sliding bearing has a first sliding surface in contact with the stub axle, and has a second sliding surface in contact with a contact surface of the axle beam.

2. A steering spindle arrangement according to claim 1, further comprising the sliding bearing is annular and is arranged around the spindle bolt in an area of the spindle bolt between the first part and the central part of the spindle bolt.

3. A steering spindle arrangement according to claim 2, wherein the sliding bearing is made of a rigid metal material.

4. A steering spindle arrangement according to claim 2, further comprising the spindle bolt first part has a threaded part, and the tensioning device comprising a nut that is rotatably arranged on the threaded part of the first part of the spindle bolt.

5. A steering spindle arrangement according to claim 1, further comprising the first bearing is a roller bearing, and the tensioning device is configured to generate said compressive force against the sliding bearing via the roller bearing for pre-tensioning the roller bearing at the same time as the tensioning device produces said rotational resistance between the stub axle and the spindle bolt.

6. A steering spindle arrangement according to claim 5, further comprising the roller bearing includes an inner ring configured and operable to contact the nut and to contact an outer ring of the roller bearing; and
 a bearing seat in the first arm of the stub axle that bears on the outer ring of the bearing.

7. A steering spindle arrangement according to claim 1, further comprising a seal around the spindle bolt and in contact with the spindle bolt, the sliding bearing and the first arm of the stub axle.

8. A steering spindle arrangement according to claim 1, further comprising the second bearing comprises a sliding bearing or a needle bearing.

* * * * *